United States Patent
Kim et al.

(10) Patent No.: US 8,405,803 B2
(45) Date of Patent: Mar. 26, 2013

(54) LIQUID CRYSTAL DISPLAY DEVICE HAVING INCREASED VISUAL SENSITIVITY

(75) Inventors: Young-Hoon Kim, Incheon (KR); Joong-Min Yoon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 755 days.

(21) Appl. No.: 12/591,221

(22) Filed: Nov. 12, 2009

(65) Prior Publication Data

US 2010/0134728 A1    Jun. 3, 2010

(30) Foreign Application Priority Data

Dec. 2, 2008  (KR) .................... 10-2008-0121270

(51) Int. Cl.
  *G02F 1/1343*  (2006.01)
  *G02F 1/1335*  (2006.01)
  *H01L 29/04*  (2006.01)
  *H01L 29/10*  (2006.01)
  *H01L 31/00*  (2006.01)
  *H01L 27/14*  (2006.01)

(52) U.S. Cl. .......... 349/109; 349/39; 349/108; 349/139; 349/144; 349/145; 257/59; 257/72

(58) Field of Classification Search .................. 349/108, 349/109, 39, 106, 110, 139, 141–146; 257/59, 257/72
See application file for complete search history.

(56) References Cited

U.S. PATENT DOCUMENTS

| | | | | |
|---|---|---|---|---|
| 5,777,707 | A  * | 7/1998 | Masaki et al. | 349/110 |
| 6,144,435 | A  * | 11/2000 | Yokoyama et al. | 349/133 |
| 7,139,058 | B2 * | 11/2006 | Son et al. | 349/141 |
| 7,333,170 | B2 * | 2/2008 | Baek | 349/141 |
| 7,714,970 | B2 * | 5/2010 | Kim et al. | 349/144 |
| 2005/0140906 | A1 | 6/2005 | Baek | |

FOREIGN PATENT DOCUMENTS

| | | |
|---|---|---|
| CN | 1612024 | 5/2005 |
| CN | 1836188 | 9/2006 |
| CN | 1900800 | 1/2007 |

* cited by examiner

*Primary Examiner* — Bumsuk Won
*Assistant Examiner* — Paisley L Arendt
(74) *Attorney, Agent, or Firm* — McKenna Long & Aldridge, LLP

(57) ABSTRACT

A liquid crystal display device includes a first substrate; first to fourth pixels arranged in a matrix pattern on the first substrate, the fourth pixel having an area smaller than each of the first and second pixels and larger than the third pixel; a second substrate facing the first substrate; first to fourth color filter patterns formed on the second substrate and respectively corresponding to the first to fourth pixels, wherein the first to fourth color filter patterns have green, blue, white and red colors, respectively; and a liquid crystal layer interposed between the first and second substrates.

8 Claims, 5 Drawing Sheets

LIQUID CRYSTAL DISPLAY DEVICE HAVING INCREASED VISUAL SENSITIVITY

The present application claims the benefit of Korean Patent Application No. 10-2008-0121270 filed in Korea on Dec. 2, 2008, which is hereby incorporated by reference.

BACKGROUND OF THE INVENTION

1. Field of the Invention

The present invention relates to a liquid crystal display (LCD) device and more particularly to an LCD device having red, green, blue and white sub-pixels arranged in a matrix pattern.

2. Discussion of the Related Art

As the society has entered in earnest upon an information age, flat panel display devices, which have excellent capabilities of a thin profile, light weight and low power consumption, and so on, are introduced. For example, the flat panel display devices include an LCD device, a plasma display panel (PDP) device, a vacuum fluorescent display (VFD) device and an electroluminescent display (ELD) device.

Among these devices, LCD devices are widely used for notebook computers, monitors, TV, and so on instead of a cathode ray tube (CRT), because of their high contrast ratio and characteristics adequate to display moving images.

The LCD device uses optical anisotropy and polarization properties of liquid crystal molecules. The liquid crystal molecules have a definite alignment direction as a result of their thin and long shapes. The LCD device includes a liquid crystal panel as an essential element. The liquid crystal panel includes a pair of substrates. On each of the substrates, first and second electrodes are formed to generate an electric field. The alignment direction of the liquid crystal molecules can be controlled by application of the electric field across the liquid crystal molecules. As the intensity or direction of the electric field is changed, the alignment of the liquid crystal molecules also changes. Since incident light is refracted based on the orientation of the liquid crystal molecules due to the optical anisotropy of the liquid crystal molecules, images can be displayed by controlling light transmissivity.

The liquid crystal panel includes first and second substrates and a liquid crystal layer interposed therebetween. An array element is formed on the first substrate. The first substrate may be called as an array substrate. Gate and data lines cross each other such that pixels arranged in a matrix shape are defined. A thin film transistor is formed at a crossing portion of the gate and data lines and is connected to a pixel electrode in the pixel region. In addition, a color filter element, for example, a color filter layer, a common electrode, and so on, is formed on the second substrate. The second substrate may be called as a color filter substrate.

Figure 1A:
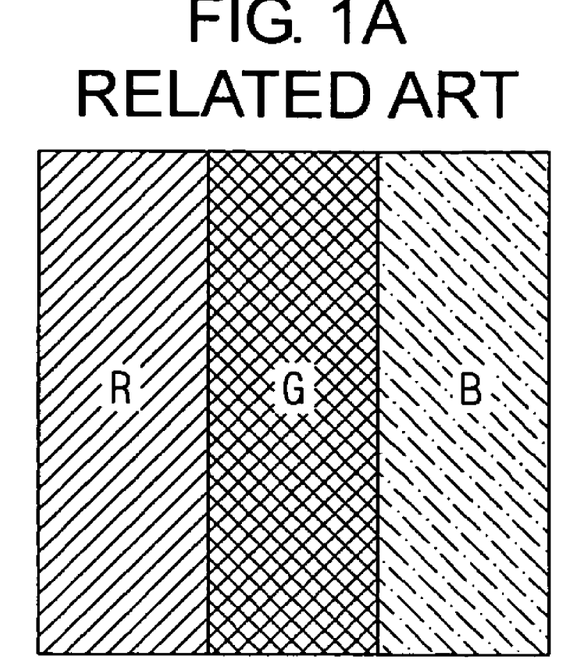
FIGS. 1A and 1B are schematic plan views illustrating a pixel arrangement of the related art LCD device.
Figure 1B:
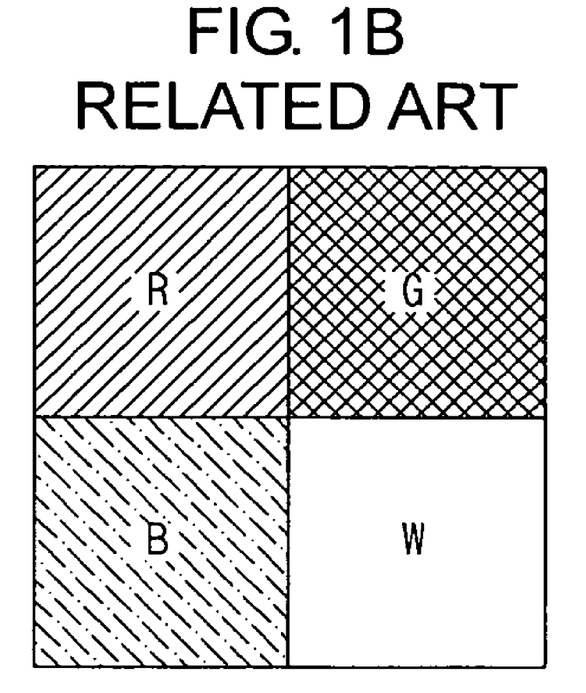

FIGS. 1A and 1B are schematic plan views illustrating a pixel arrangement of the related art LCD device.

FIG. 1A shows a vertical stripe type pixel arrangement. In FIG. 1A, red (R), green (G) and blue (B) sub-pixels, which are defined by crossing gate and data lines, are alternately arranged along a horizontal line. The R, G and B sub-pixels constitute a pixel unit.

FIG. 1B shows a quad type pixel arrangement. In FIG. 1B, R, G, B and white (W) sub-pixels are arranged in a matrix pattern. The R, G, B and W sub-pixels constitute a pixel unit. The LCD device having the quad type pixel arrangement further includes the W sub-pixel. Accordingly, the LCD device having the quad type pixel arrangement has an improved white brightness. Each of the R, G, B and W sub-pixels has the same area as one another. Namely, an area of the W sub-pixels is 25% with respect to an entire area.

In the quad type pixel arrangement, the white brightness is improved. However, since an area of the R, G and B sub-pixels is reduced, brightness of pure color in R, G and B colors is decreased. Particularly, a visual sensitivity in a yellow color is distinguishably decreased. The yellow color is very sensitive such that an image quality is deteriorated because of decrease of the yellow color sense. In addition, a brightness difference between gray and white colors is increased due to increase of the white brightness, so that an image quality is further deteriorated.

SUMMARY OF THE INVENTION

Accordingly, the present invention is directed to an LCD device that substantially obviates one or more of the problems due to limitations and disadvantages of the related art.

An object of the present invention is to provide an LCD device being capable of providing images of improved brightness.

An object of the present invention is to provide an LCD device being capable of improving a color balance.

An object of the present invention is to provide an LCD device having an improved aperture ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a first substrate; first to fourth pixels arranged in a matrix pattern on the first substrate, the fourth pixel having an area smaller than each of the first and second pixels and larger than the third pixel; a second substrate facing the first substrate; first to fourth color filter patterns formed on the second substrate and respectively corresponding to the first to fourth pixels, wherein the first to fourth color filter patterns have green, blue, white and red colors, respectively; and a liquid crystal layer interposed between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 2:
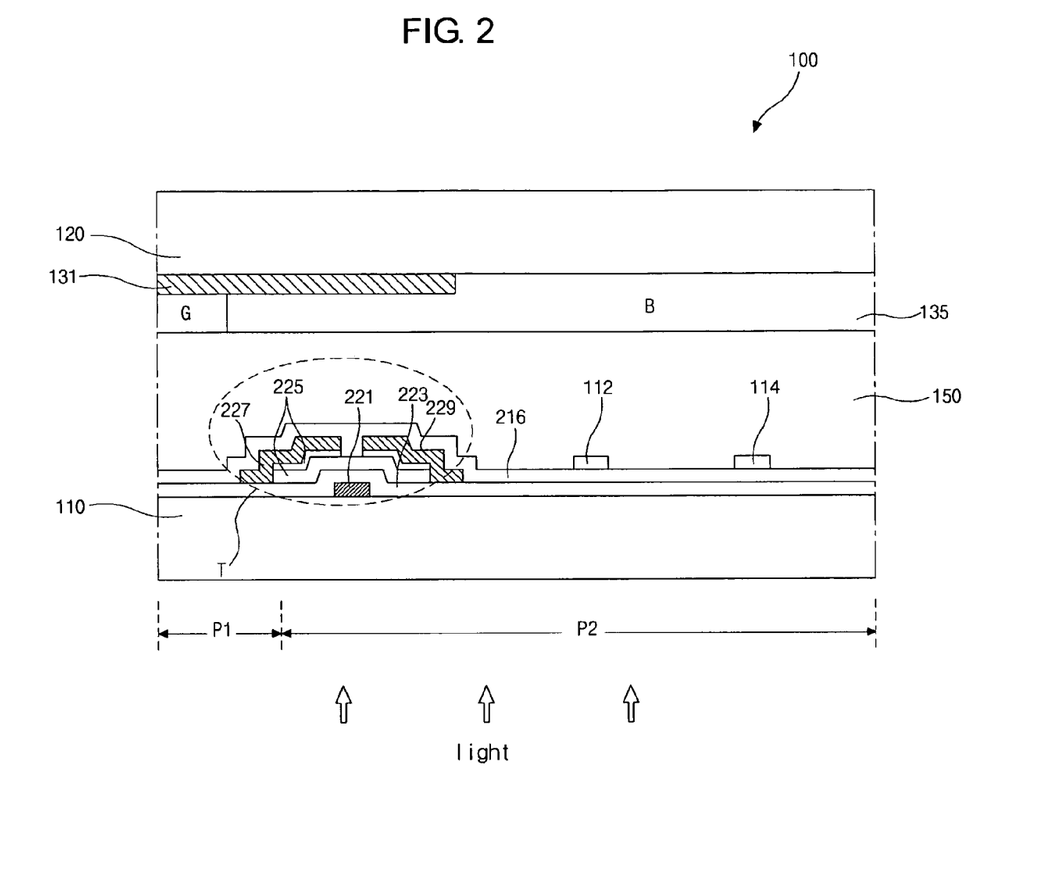
FIG. 2 is a cross-sectional view of an LCD device according to the present invention.

FIG. 2 is a cross-sectional view of an LCD device according to the present invention. FIG. 2 shows an in-plane switching (IPS) mode LCD device. In FIG. 2, an LCD device 100 includes a first substrate 110, a second substrate 120 facing the first substrate 110 and a liquid crystal layer 150 interposed therebetween. A plurality of sub-pixels P1 and P2 are defined on the first substrate 110 by gate and data lines (not shown) crossing each other. A thin film transistor TFT T is formed at a crossing portion of the gate and data lines. The TFT T includes a gate electrode 221, a gate insulating layer 223, a semiconductor layer 225 including an active layer 225a and an ohmic contact layer 225b, a source electrode 227 and a drain electrode 229. The gate electrode 221 is connected to the gate line and disposed on the first substrate 110. The gate insulating layer 223 is formed of an inorganic insulating material, for example, silicon oxide or silicon nitride, and covers the gate electrode 221. The semiconductor layer 225 is disposed on the gate insulating layer 223 and corresponds to the gate electrode 221. The source and drain electrode 227 and 229 are disposed on the semiconductor layer 225 and spaced apart from each other. The source electrode 227 is connected to the data line.

A passivation layer 216 including a drain contact hole (not shown) is formed on the TFT T. The drain contact hole exposes the drain electrode 229. A common electrode 112 and a pixel electrode 114 are disposed in each pixel region and on the passivation layer 216. The pixel electrode 114 is connected to the drain electrode 229 through the drain contact hole. The common electrode 112 is alternately arranged with and parallel to the pixel electrode 114. A horizontal electric field is generated between the common and pixel electrodes 112 and 114 such that liquid crystal molecules in the liquid crystal layer 150 are driven by the horizontal electric field. One common electrode 112 and one pixel electrode 114 are shown in FIG. 2. However, there may be at least two common electrodes 112 and at least two pixel electrodes 114. Each of the common and pixel electrodes 112 and 114 is formed of a transparent conductive material, for example, indium-tin-oxide (ITO) or indium-zinc-oxide (IZO). Namely, the common electrode 112 is formed on the same layer and of the same material as the pixel electrode 114. Alternatively, the common electrode 112 may be formed on a different layer and a different material than the pixel electrode 114. For example, the common electrode 112 may be formed on the same layer and of the same material as the gate electrode. In this case, the common electrode 112 may be formed of a low resistance metallic material, such as aluminum and aluminum alloy. In addition, the pixel electrode 114 may be formed of the same material and on the same layer as the source electrode 227. Although not shown, a common line for providing a common voltage into the common electrode 112 is also formed on the first substrate 110. The common line may be formed of the same material and on the same layer as the gate line. The first substrate 110 including the above elements may be called as an array substrate.

A black matrix 131 corresponding to the gate line and the data line is formed on the second substrate 120. The black matrix 131 shields the gate and data lines. The black matrix 131 may further shield the TFT T. A light leakage problem is prevented due to the black matrix 131. The black matrix 131 includes an opening corresponding to each of the sub-pixels P1 and P2. A color filter layer 135 including color filter patterns 135a and 135b is formed in the opening of the black matrix 131. FIG. 2 shows green (G) and blue (B) color filter patterns 135a and 135b. However, the color filter layer 135 further includes red and white color filter patterns as described below. An overcoat layer (not shown) may be further formed on the color filter layer 135. The second substrate 131, where the above elements are formed, may be called as a color filter substrate.

As mentioned above, the liquid crystal layer 150 is formed between the first and second substrates 110 and 120. The liquid crystal molecules in the liquid crystal layer 150 are arranged to be parallel to the first and second substrates 110 and 120. Although not shown, first and second polarizing plates are formed on an outer side of each of the first and second substrates 110 and 120, respectively. Light having a pre-determined optical axis can selectively pass through the first and second polarizing plates. The liquid crystal molecules have an initial arrangement of about 90 or 270 degrees with respect to a horizontal pixel direction. The first polarizing plate has a first optical axis of one of 0 or 90 degrees with respect to the horizontal pixel direction, while the second polarizing plate has a second optical axis of the other one of 0 or 90 degrees with respect to the horizontal pixel direction. Namely, the first optical axis of the first polarizing plate is perpendicular to the second optical axis of the second polarizing plate. The IPS mode LCD device having the above conditions can display images of a wide viewing angle.

Although not shown, a column spacer providing a pre-determined distance between the first and second substrates 110 and 120 is further formed. Instead of the column spacer, a ball type spacer may be formed. A seal pattern is formed at edges of the first and second substrates 110 and 120 to seal the liquid crystal layer 150. A backlight unit as a light source is disposed under the first substrate 110. The backlight unit provides light onto the first substrate 110.

In the LCD device, when the TFT T is turned on by a voltage through the gate line, an image signal is applied to the pixel electrode 114. An electric field is generated by a difference in voltages between the common and pixel electrodes 112 and 114 such that an arrangement of the liquid crystal molecules is controlled. As the intensity or direction of the electric field is changed, the alignment of the liquid crystal molecules also changes. Since incident light is refracted based on the orientation of the liquid crystal, images can be displayed by controlling light transmissivity.

Figure 3:
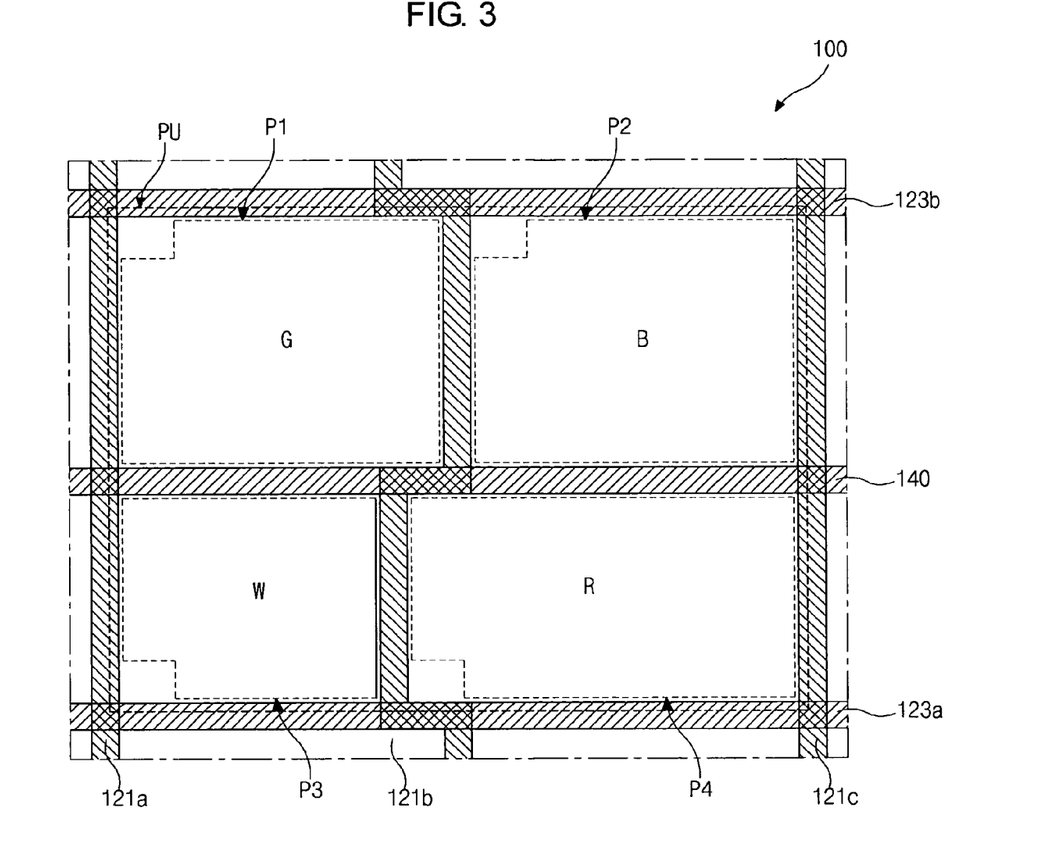
FIG. 3 is a plan view illustrating a portion of a pixel unit of an LCD device according to the present invention.

FIG. 3 is a plan view illustrating a portion of a pixel unit of an LCD device according to the present invention. In FIG. 3, first to third data lines 121a, 121b and 121c and first and second gate lines 123a and 123b are formed on the first substrate (not shown). The first and second gate lines 123a and 123b are parallel to each other. The second data line 121b is disposed between the first and third data lines 121a and 121c. Each of the first and third data lines 121a and 121c is straight to be parallel to each other, while the second data line 121b has concave and convex patterns. Each of the first to third data lines 121a to 121c crosses each of the first and second gate lines 123a and 123b. For example, a direction of the first to third data lines 121a to 121c may be perpendicular to a direction of the first and second gate lines 123a and 123b. A common line 140 is disposed between the first and second gate lines 123a and 123b. The common line 140 is parallel to each of the first and second gate lines 123a and 123b. The common line 140 is formed on the same layer and of the same material as the first and second gate lines 123a and 123b, while the first to third data lines 121a, 121b and 121c are formed on a different layer and of a different material from the first and second gate lines 123a and 123b.

An LCD device 100 includes a pixel unit P including first to fourth sub-pixels P1, P2, P3 and P4. The first to fourth sub-pixels P1, P2, P3 and P4 are arranged in a matrix pattern of two by two. The first sub-pixel P1 is surrounded by the first and second data lines 121a and 121b, the second gate line 123b and the common line 140, and the second sub-pixel P2 is surrounded by the second and third data lines 121b and 121c, the second gate line 123b and the common line 140. The third sub-pixel P3 is surrounded by the first and second data lines 121a and 121b, the first gate line 123a and the common line 140, and the fourth sub-pixel P4 is surrounded by the second and third data lines 121b and 121c, the first gate line 123b and the common line 140. Namely, the first and second sub-pixels P1 and P2 are disposed in a (2N−1)th row, and the third and fourth sub-pixels P3 and P4 are disposed in a (2N)th row. (N is a positive integer) This arrangement of the sub-pixels P1 to P4 may be called as a quad type.

The first data line 121a in the (2N−1)th row has a first distance to the second data line 121b, and the third data line 121c in the (2N−1)th row has a second distance, which is equal to the first distance, to the second data line 121b. Meanwhile, the first data line 121a in the (2N)th row has a third distance to the second data line 121b, and the third data line 121c in the (2N)th row has a fourth distance, which is larger than the third distance, to the second data line 121b. As a result, the first and second sub-pixels P1 and P2 have the same area as each other, while the third sub-pixel P3 has an area smaller than that of the fourth sub-pixel P4.

In addition, the common line 140 is closer to the first gate line 123a than the second gate line 123b. A position of the common line 140 with respect to the first and second gate lines 123a and 123b and a position of the second gate line 121b in the (2N)th row with respect to the first and third data lines 121a and 121c are controlled to determine an area ratio of first to fourth sub-pixels P1 to P4. Each of the first and second sub-pixels P1 and P2 has an area of about 1.1 to 1.25 of an area of the fourth sub-pixel P4, and the third sub-pixel P3 has an area of about 0.9 to 0.75 of an area of the fourth sub-pixel P4.

On the second substrate (not shown), red (R), green (G), blue (B) and white (W) color filter patterns are formed. The G, B, W and R color filter patterns correspond to the first to fourth sub-pixels P1 to P4, respectively. As a result, the G and B color filter patterns have the same area as each other, while the W color filter pattern has an area smaller than that of the R color filter pattern.

Since the LCD device 100 includes the W color filter pattern with the R, G and B color filter patterns, the LCD device can provide an improved white brightness. In addition, the W color filter pattern has a smaller area than each of the R, G and B color filter patterns such that a balance in brightness and color purity is also improved.

An arrangement of the pixels P1 to P4 can be applied to not only the IPS mode LCD device but also a twisted nematic (TN) mode LCD device. In the TN mode LCD device, the pixel electrode is formed on the first substrate, e.g., a lower substrate, while the common electrode is formed on the second substrate, e.g., an upper substrate. In this case, the pixel and common electrodes have a plate shape. The liquid crystal layer is driven by a vertical electric field between the pixel and common electrodes.

In the present invention, to prevent a problem of decrease of a visual sensitivity in a yellow color, the G color filter pattern, a green color of which has an optical efficiency smaller than a red color, has a larger area than the R color filter pattern. In addition, since an area of the B color filter pattern is larger than that of the R color filter pattern, a color temperature of the LCD panel is improved. The color temperature is a mark of a light color of the light source. If the light color is close to an orange color, the light has a relatively low color temperature. Meanwhile, if the light color is close to a blue color, the light has a relatively high color temperature. As a result, when the LCD panel has a high color temperature, image of the LCD device is brighter. If the B color filter pattern has smaller area, there is a problem that the LCD panel displays a yellowish-white color. However, sine an area of the B color filter pattern is larger than that of the R color filter pattern in the present invention, there is no problem. As mentioned above, although an area of the W color filter pattern (the third sub-pixel P3) is smaller than an area of each of the G, B and R color filter pattern (the first, second and fourth sub-pixels P1, P2 and P4), there is no problem in brightness of images because the W color light has brightness of at least twice as much as each of the R, G and B color light. Accordingly, even if the W color filter pattern has an area of 0.75 of the R color filter pattern, there is no problem. It is preferred that an area of each of the G and B color filter patterns (the first and second sub-pixels P1 and P2) is 1.25 as much as an area of the R color filter pattern (the fourth sub-pixel P4) and an area of the W color filter pattern (the third sub-pixel P3) is about 0.75 25 as much as an area of the R color filter pattern.

The R, G, B and W quad type pixel arrangement can provide an improved brightness image with compared to the R, G and B stripe type pixel arrangement as describe below. Assume the R, G and B color filter patterns have the same area as one another and a light transmittance in each of the R, G and B color filter patterns is ⅓. The W color filter pattern has a light transmittance of 1. In the R, G and B stripe type pixel arrangement, a total transmittance in one pixel unit is 33.3%. ([⅓*⅓(R)]+[⅓*⅓(G)]+[⅓*⅓(B)]=⅓=33.3%) However, in The R, G, B and W quad type pixel arrangement, a total transmittance in one pixel unit is 50%. ([¼*⅓(R)]+[¼*⅓(G)]+[¼*⅓(B)]+[¼*1(W)]=½=50%) Namely, the LCD device having the quad type pixel arrangement in the present invention has an image brightness of about 1.5 as much as the LCD device having the tripe type pixel arrangement. In addition, since each of the R, G and B color filter patterns has an area larger than the W color filter pattern, the color purity of the R, G and B colors is also improved. Furthermore, since an area of the W color filter pattern is smaller than the related art quad type pixel arrangement, where the W color filter pattern has the same area as each of the R, G and B color filter patterns, the above-mentioned problem of an image quality resulted from an increase of a brightness difference between gray and white colors can be also overcome.

In the present invention, the first and second sub-pixels P1 and P2 in the (2N−1)th row shares the common line 140 with the third and fourth sub-pixels P3 and P4 in the (2N)th row. Since the black matrix 131 does not cover the common line 140, an aperture ratio is improved as described below with FIGS. 4A and 4B.

Figure 4A:
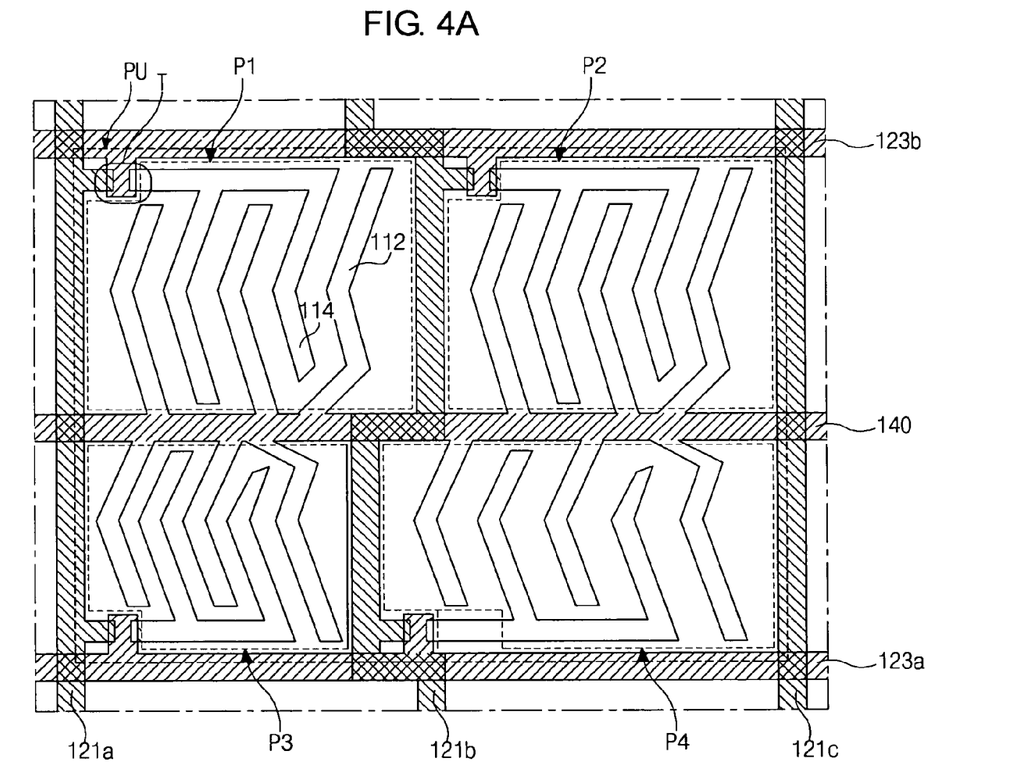
FIGS. 4A and 4B are schematic plan views respectively illustrating an array substrate and a color filter substrate for an LCD device according to the present invention.
Figure 4B:
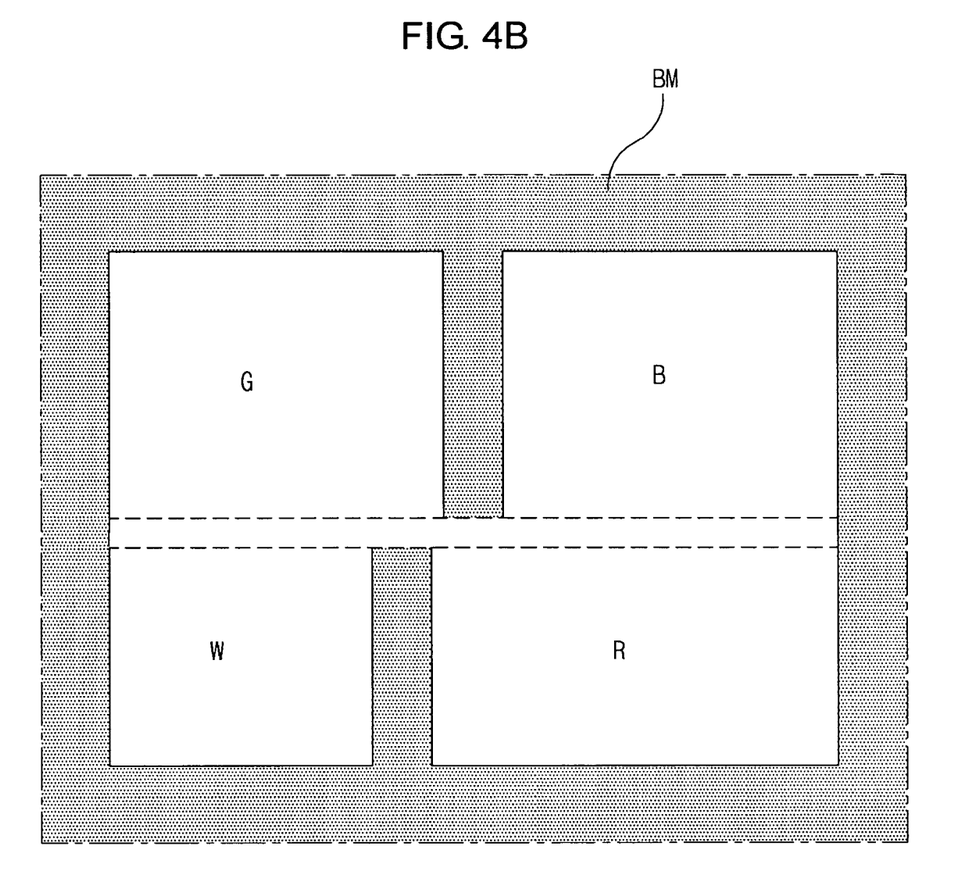

FIGS. 4A and 4B are schematic plan views respectively illustrating an array substrate and a color filter substrate for an LCD device according to the present invention. As shown in FIGS. 4A and 4B, the first to fourth sub-pixels P1 to P4 of the pixel unit PU are arranged in a matrix shape. The first to fourth sub-pixels P1 to P4 correspond to the G, B, W and R color filter patterns.

First to third data lines 121a, 121b and 121c and first and second gate lines 123a and 123b are formed on the first substrate (not shown). The second data line 121b is disposed between the first and third data lines 121a and 121c. Each of the first and third data lines 121a and 121c is straight, while the second data line 121b has concave and convex patterns. Each of the first to third data lines 121a to 121c crosses each of the first and second gate lines 123a and 123b. For example, a direction of the first to third data lines 121a to 121c may be perpendicular to a direction of the first and second gate lines 123a and 123b. A common line 140 is disposed between the first and second gate lines 123a and 123b.

The first sub-pixel P1 is surrounded by the first and second data lines 121a and 121b, the second gate line 123b and the common line 140, and the second sub-pixel P2 is surrounded by the second and third data lines 121b and 121c, the second gate line 123b and the common line 140. The third sub-pixel P3 is surrounded by the first and second data lines 121a and 121b, the first gate line 123a and the common line 140, and the fourth sub-pixel P4 is surrounded by the second and third data lines 121b and 121c, the first gate line 123b and the common line 140. Namely, the first and second sub-pixels P1 and P2 are disposed in a (2N−1)th row, and the third and fourth sub-pixels P3 and P4 are disposed in a (2N)th row. (N is a positive integer) This arrangement of the sub-pixels P1 to P4 may be called as a quad type.

The first data line 121a in the (2N−1)th row has a first distance to the second data line 121b, and the third data line 121c in the (2N−1)th row has a second distance, which is equal to the first distance, to the second data line 121b. Meanwhile, the first data line 121a in the (2N)th row has a third distance to the second data line 121b, and the third data line 121c in the (2N)th row has a fourth distance, which is larger than the third distance, to the second data line 121b. As a result, the first and second sub-pixels P1 and P2 have the same area as each other, while the third sub-pixel P3 has an area smaller than that of the fourth sub-pixel P4.

In addition, the common line 140 is closer to the first gate line 123a than the second gate line 123b. A position of the common line 140 with respect to the first and second gate lines 123a and 123b and a position of the second gate line 121b in the (2N)th row with respect to the first and third data lines 121a and 121c are controlled to determine an area ratio of first to fourth sub-pixels P1 to P4.

A TFT T is disposed in each of the first to fourth sub-pixels P1 to P4. The TFT T in the first sub-pixel P1 is connected the first data line 121a and the second gate line 123b, and the TFT in the second sub-pixel P2 is connected to the second data line 121b and the second gate line 123b. The TFT in the third sub-pixel P3 is connected the first data line 121a and the first gate line 123a, and the TFT in the fourth sub-pixel P4 is connected to the second data line 121b and the first gate line 123a. The TFT T includes a gate electrode, a gate insulating layer, a semiconductor layer, a source electrode and a drain electrode.

A common electrode 112 and a pixel electrode 114 are disposed in each of the first to fourth sub-pixels P1 to P4. The common electrodes 112 in the first to fourth sub-pixels P1 to P4 are connected to a single common line 140. The pixel electrode 114 in each of the first to fourth sub-pixels P1 to P4 is connected to the TFT T in each of the first to fourth sub-pixels P1 to P4. The pixel electrode 114 is alternately arranged with the common electrode 112.

As mentioned above, the first and second sub-pixels P1 and P2 in the (2N−1)th row shares the common line 140 with the third and fourth sub-pixels P3 and P4 in the (2N)th row. No electrode except the pixel electrode 114 is disposed at a perimeter of the common line 140 such that a distortion of an electric field is not generated at the perimeter of the common line 140. As a result, a black matrix BM is not required to shield the common line 140, so that an aperture ratio is improved. Namely, the black matrix BM shields the first and second gate lines 123a and 123b and the first to third data lines 121a to 121c except the common line 140.

G, B, W and R color filter patterns corresponds to the first to fourth sub-pixels P1 to P4, respectively. The black matrix BM corresponds to the first to third data lines 121a, 121b and 121c and the first and second gate lines 123a and 123b, so that a light leakage at a perimeter of each of the first to third data lines 121a, 121b and 121c and the first and second gate lines 123a and 123b is prevented. Although not shown, the black matrix BM may further shield the TFT T. As mentioned above, the black matrix BM does not correspond to the common line 140. Accordingly, an aperture ratio is improved.

In the LCD device, the R color filter pattern has an area smaller than each of the G and B color filter patterns and larger than the W color filter such that a balance in brightness and color purity is improved.

In addition, the black matrix for shielding the common line is not required such that an aperture ratio is improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a first substrate;
   first to fourth pixels arranged in a matrix pattern on the first substrate, the fourth pixel having an area smaller than each of the first and second pixels and larger than the third pixel, wherein an area of the first pixel is equal to an area of the second pixel;
   a second substrate facing the first substrate;
   first to fourth color filter patterns formed on the second substrate and respectively corresponding to the first to fourth pixels, wherein the first to fourth color filter patterns have green, blue, white and red colors, respectively;
   a liquid crystal layer interposed between the first and second substrates;
   first and second gate lines on the first substrate;
   a single common line on the first substrate and between the first and second gate lines; and
   first to third data lines on the first substrate and crossing the first and second gate lines and the common line, the second data line disposed between the first and third data lines,
   wherein the first pixel is surrounded by the first and second data lines, the second gate line and the common line, and the second pixel is surrounded by the second and third data lines, the second gate line and the common line, and wherein the third pixel is surrounded by the first and second data lines, the first gate line and the common line, and the fourth pixel is surrounded by the second and third data lines, the first gate line and the common line,
   wherein the second data line between the first gate line and the common line is closer to the first data line than the third data line, and the second data line between the second gate line and the common line has the same distance with respect to the first and third data lines, and
   wherein an area of the blue color filter pattern is larger than an area of the red color filter pattern.

2. The device according to claim 1, wherein the single common line is closer to the first gate line than the second gate line.

3. The device according to claim 1, further comprising a black matrix on the second substrate.

4. The device according to claim 3, wherein the black matrix shields the first and second gate lines and the first to third data lines except the single common line.

5. The device according to claim 1, wherein the single common line is formed on the same layer and of the same material as the first and second gate lines, and the first to third data lines are formed on a different layer and of a different material as the first and second gate lines.

6. The device according to 1, further comprising:
   a first thin film transistor in the first pixel and connected to the first data line and the second gate line;
   a second thin film transistor in the second pixel and connected to the second data line and the second gate line;
   a third thin film transistor in the third pixel and connected to the first data line and the first gate line;
   a fourth thin film transistor in the fourth pixel and connected to the second data line and the first gate line;
   a pixel electrode in the first to fourth pixels and respectively connected to the first to fourth thin film transistors; and
   a common electrode in the first to fourth pixels and connected to the single common line, wherein the common electrode is alternately arranged with the pixel electrode.

7. The device according to claim 1, wherein an area of each of the first and second pixels is about 1.25 to 1.1 of an area of the fourth pixel, and an area of the third pixel is about 0.9 to 0.75 of an area of the fourth pixel.

8. The device according to claim 1, further comprising a pixel electrode on the first substrate and a common electrode on the second substrate.

* * * * *